United States Patent
Jain

(10) Patent No.: US 7,783,698 B2
(45) Date of Patent: Aug. 24, 2010

(54) GENERALIZED WEB-SERVICE

(75) Inventor: Kamal Jain, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 656 days.

(21) Appl. No.: 11/379,173

(22) Filed: Apr. 18, 2006

(65) Prior Publication Data

US 2007/0156702 A1 Jul. 5, 2007

Related U.S. Application Data

(60) Provisional application No. 60/751,334, filed on Dec. 16, 2005.

(51) Int. Cl.
*G06F 17/30* (2006.01)
*G06F 15/16* (2006.01)

(52) U.S. Cl. .............. 709/203; 709/217; 709/218; 709/219; 709/225; 709/226; 709/229; 707/707; 707/708; 707/709; 707/710; 707/711; 707/712; 707/722; 707/830

(58) Field of Classification Search .......... 709/203, 709/223–226, 229, 217–219; 707/10, 707–712, 707/722, 741, 770, 830
See application file for complete search history.

(56) References Cited

U.S. PATENT DOCUMENTS

| | | | |
|---|---|---|---|
| 6,094,675 A * | 7/2000 | Sunaga et al. ............. 709/204 |
| 6,405,202 B1 * | 6/2002 | Britton et al. ............... 1/1 |
| 7,076,558 B1 * | 7/2006 | Dunn ....................... 709/229 |
| 7,325,040 B2 * | 1/2008 | Truong ..................... 709/217 |
| 7,380,003 B1 * | 5/2008 | Guo et al. ................. 709/226 |
| 7,404,203 B2 * | 7/2008 | Ng ............................. 726/6 |
| 7,599,934 B2 * | 10/2009 | Conlan et al. ............... 1/1 |
| 2002/0031230 A1 * | 3/2002 | Sweet et al. .............. 380/278 |
| 2003/0084151 A1 * | 5/2003 | Simpson et al. .......... 709/225 |
| 2003/0187974 A1 * | 10/2003 | Burbeck et al. .......... 709/224 |
| 2005/0187895 A1 * | 8/2005 | Paya et al. ................ 707/1 |
| 2005/0216465 A1 * | 9/2005 | Dutta et al. ............... 707/9 |
| 2005/0246716 A1 * | 11/2005 | Smith et al. .............. 719/315 |
| 2006/0031414 A1 * | 2/2006 | Betts et al. ................ 709/219 |
| 2006/0048153 A1 * | 3/2006 | Truong ..................... 718/100 |
| 2006/0069702 A1 * | 3/2006 | Moeller et al. ............ 707/200 |
| 2006/0165040 A1 * | 7/2006 | Rathod et al. ............. 370/335 |
| 2006/0190990 A1 * | 8/2006 | Gruper et al. ............. 726/3 |
| 2007/0022125 A1 * | 1/2007 | Salam et al. .............. 707/100 |
| 2007/0050252 A1 * | 3/2007 | Jain .......................... 705/14 |
| 2007/0050253 A1 * | 3/2007 | Biggs et al. ............... 705/14 |
| 2007/0100961 A1 * | 5/2007 | Moore ...................... 709/217 |
| 2007/0130621 A1 * | 6/2007 | Marinescu et al. ........ 726/22 |
| 2007/0203789 A1 * | 8/2007 | Jain et al. ................. 705/14 |

* cited by examiner

*Primary Examiner*—Alina N. Boutah
(74) *Attorney, Agent, or Firm*—Lee & Hayes, PLLC

(57) ABSTRACT

The claimed subject matter provides systems and/or methods that facilitate providing a generalized web service. An interface component can obtain data from a client component. Additionally, a general web service component can store the data with user selected access permissions and enable retrieving and modifying the data from any location. The general web service component can employ a centralized infrastructure, a peer-to-peer infrastructure built upon any number of client components, or a combination thereof.

18 Claims, 13 Drawing Sheets

GENERALIZED WEB-SERVICE

CROSS-REFERENCE TO RELATED APPLICATIONS

This application claims the benefit of U.S. Provisional Application Ser. No. 60/751,334 filed on Dec. 16, 2005, and entitled A GENERALIZED WEB-SERVICE. The entirety of the aforementioned application is incorporated herein by reference.

BACKGROUND

Technological advances in computer hardware, software and networking have lead to efficient, cost effective computing systems (e.g., desktop computers, laptops, handhelds, cell phones, servers, . . . ) that can communicate with each other from essentially anywhere in the world in order to exchange information. These systems continue to evolve into more reliable, robust and user-friendly systems. As a consequence, more and more industries and users are purchasing computers and utilizing them as viable electronic alternatives for communicating with disparate users at remote locations, gathering information (e.g. from disparate users), retaining information, etc.

Computers conventionally utilize an operating system, which can be system software responsible for direct control and/or management of hardware and basic system operations. Further, the operating system can provide a foundation upon which application software can be executed. Thus, an operating system can be a platform that allows a computer to be used in a multitude of different ways. For example, a calculator program can be developed and installed upon the computer and thereafter the computer can be utilized as a calculator. According to a further example, a video player program and/or a game player program can be developed and installed; thus, the computer can be employed as a DVD player and/or a video game console, respectively.

Typical operating systems can be developed in a manner that enables already conceived applications to be programmed. Further, common operating systems can be developed with such generality so that applications conceived in the future can be programmed and/or supported. Conventional operating systems can provide for low level interaction with hardware, libraries that can be employed by applications, and/or basic programs that can manipulate files and/or configure the system.

There has been a growing trend for utilizing computers on the Internet. Basic uses of a computer on the Internet can be in connection with web services such as, for instance, web-browsing, online email, online search, online news, online trading, online classifieds, online auctions, and the like. Further, it is to be appreciated that any number of web services can be developed in the future. However, currently there is no analog of an operating system for a computer for the Internet.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to providing a generalized web service that can be leveraged to provide additional service(s) and/or feature(s). The generalize web service can be similar to an operating system for a computer and can enable managing online activities. A general web service component can enable storing and/or retrieving any type of information. For instance, the general web service component can retain information, including executable code, for any user selected purpose as opposed to conventional systems that typically store data for a predefined use (e.g., online email, online photo-share, online auction, . . . ). The general web service component can additionally be globally available; thus, data can be read from and/or written to data store(s) associated with the general web service component from anywhere in the world with any suitable device (e.g., personal computer, laptop computer, personal digital assistant (PDA), handheld computer, cellular telephone, . . . ).

According to various features of the claimed subject matter, access permissions can be defined for data stored in connection with the general web service component. For instance, a user can define access permissions for data retained in space allocated to the particular user. By way of example, access permissions can differentiate whether a disparate user can read, write, delete, execute, etc. data based upon any verifiable attribute (e.g., related to the disparate user).

Pursuant to one or more aspects of the claimed subject matter, executable code can be retained in a data store associated with the general web service component. Computations associated with operation of the executable code can be split between a server side and a client side, for instance. By way of example, light computations can be performed upon a server, while resource intensive computations can be performed on a client side. Further, subscription related information can be considered when determining whether to perform computations at the server side and/or the client side.

In accordance with various aspects of the claimed subject matter, disparate architectures can be employed in connection with the general web service component. For instance, a centralized infrastructure can be utilized. Additionally or alternatively, a peer-to-peer infrastructure can be built upon any number of client components. Further, the general web service component can be utilized to collect information, assign a context to the information, organize the information, index the information, perform searches upon the information, etc.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
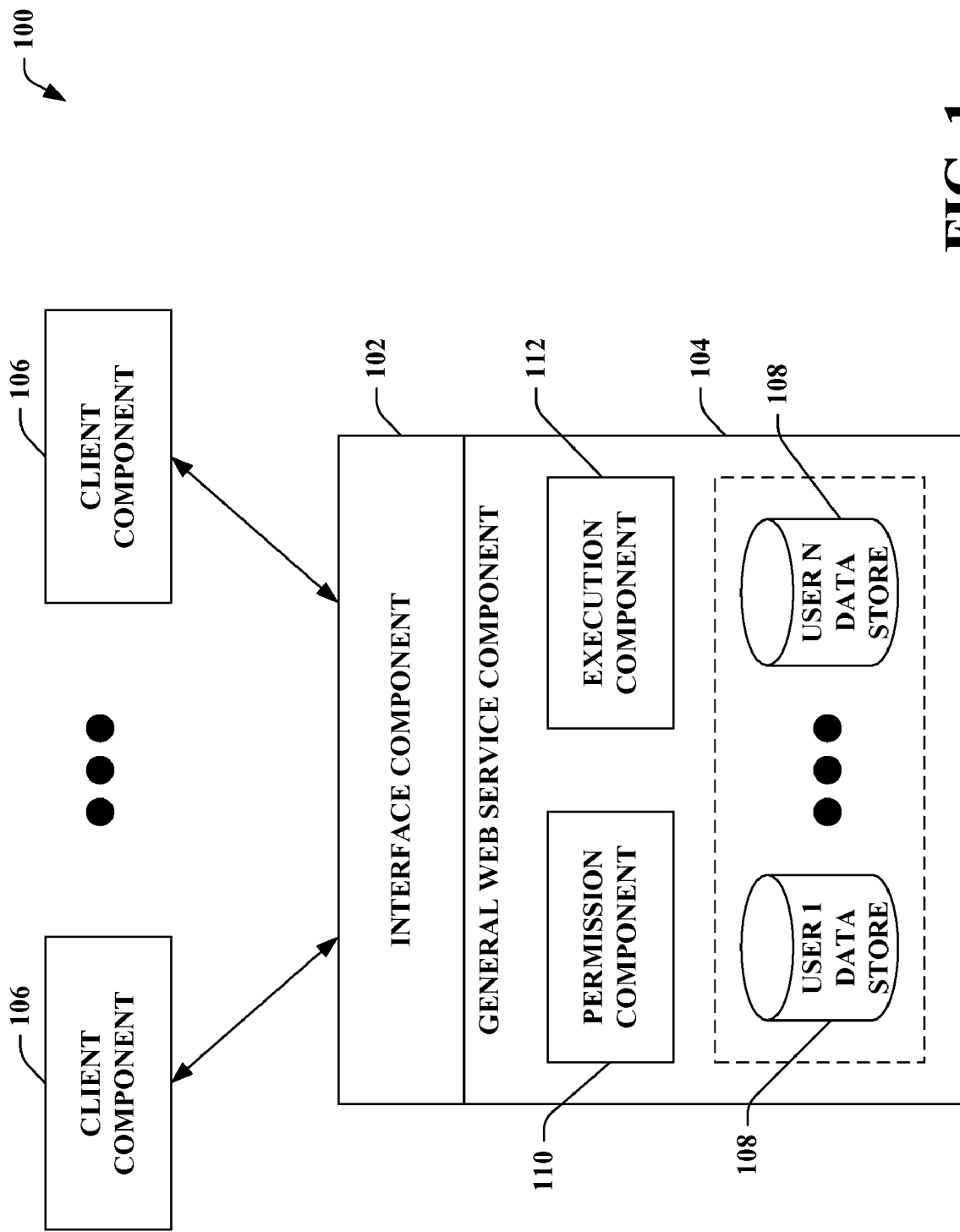
FIG. 1 illustrates a block diagram of an exemplary system that facilitates providing a generalized web service that can be a platform upon which additional service(s) and/or feature(s) can be built.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates providing a generalized web service that can be a platform upon which additional service(s) and/or feature(s) can be built. The system 100 can include an interface component 102 that can be coupled to a general web service component 104 (e.g., a global universal turing tape (GUTT)). Additionally, any number of client components 106 can communicate with the general web service component 104 by way of the interface component 102. Further, the general web service component 104 can include any number of user data stores 108 that can retain any type of data, a permission component 110 that can assign and/or enforce access permissions (e.g., write, read, delete, execute, . . . ) associated with the data retained in the user data stores 108, and/or an execution component 112 that can effectuate operation(s) associated with executable code stored in the user data stores 108.

The general web service component 104 can serve the purpose of an operating system to help manage online activities. For example, the general web service component 104 can enable low level interaction with hardware. Pursuant to a further illustration, the general web service component 104 can provide libraries that can be employed by applications built upon the general web service component 104. Additionally or alternatively, the general web service component 104 can support basic programs that can manipulate files and/or configure the general web service component 104 and/or one of the client components 106. The general web service component 104 can facilitate building already conceived web services and/or web services that can be developed in the future.

The general web service component 104 can be universal; thus, the general web service component 104 can enable storing and/or retrieving any type of information (e.g., from the user data stores 108, . . . ) including, for instance, executable code. Also, the general web service component 104 can perform operations associated with such stored code (e.g. by employing the execution component 112, . . . ). Additionally, the general web service component 104 can be global and therefore allow data to be read from and/or written to the user data stores 108 from anywhere in the world with any suitable device (e.g., one or more of the client components 106). In comparison, commonly available web servers are typically read only. Further, conventional web services such as webmail services typically allow storage and utilization of data for a particular purpose (e.g., related to sending and/or receiving emails, . . . ) as opposed to any user selected purpose; accordingly, the types of data that can be stored and/or the operations that can be performed in connection with the stored data can be limited for typical techniques.

The general web service component 104 can enable making a user's information available anywhere, anytime, and with any client component 106. The general web service component 104 can collect information, put the information in context, organize the information, index the information, and/or perform searches on the information. For instance, the general web service component 104 (and/or the user data stores 108) can be an online database, where each user can be assigned a piece of the database. However, in contrast to conventional online services such as online email, etc., the user need not be restricted to use the storage associated with the general web service component 104 (e.g., the user data stores 108) for a preassigned purpose (e.g., storage of email, . . . ).

The general web service component 104 can provide standard applications (e.g., online email applications, photo sharing applications, web logging applications, social networking applications, . . . ) and/or features (e.g., file attributes, file compression, file encryption, . . . ). The general web service component 104 can additionally store (e.g., with the user data stores 108) and/or utilize (e.g., with the execution component 112) executable code (e.g., developed by any source). Further, the general web service component 104 can support employing shortcuts to executable code, which can run within the browser of one of the client components 106; however, the claimed subject matter is not so limited. By way of illustration, the executable code can be written in HyperText Markup Language (HTML), .NET, or any suitable language.

The general web service component 104 can provide various instructions and/or commands related to accessing and/or modifying data stored in the user data stores 108. For instance, executable code can be developed via employing these instructions and/or commands by utilizing various tools associated with the general web service component 104. Additionally, it is contemplated that development tools can be provided by third parties.

By way of example, the general web service component 104 can provide query processing commands. The queries can be implemented in connection with the data stored by the users in the user data stores 108. Further, the query processing commands can honor the access permissions set by the users with the permission component 110. By way of illustration, if a user desires to deny disparate users from accessing particular data stored in her assigned user data store 108, then the permission component 110 can enforce the access permissions associated with the particular data when the general web service component 104 performs the query processing commands. According to a further example, if the user sets access permissions with the permission component 110 such that the user's friends can access stored data, then the data can be utilized in connection with a query executed by one of the user's friends. It is contemplated that the permission component 110 can employ any verifiable attribute (e.g., related to a user, data, . . . ) in connection with permitting and/or denying access to particular data associated with assigned permissions.

According to an additional example, the general web service component 104 can provide a working space and/or indexing space in which to run various applications. The applications can index data associated with the general web service component 104 in disparate manners pursuant to particular purposes associated with the applications. However, the general web service component 104 can enable the user to set file attributes which can limit the manner in which a file is indexed.

It is to be appreciated that the system 100 can include any number of client components 106. The client components 106 can be, for instance, personal computers, laptop computers, personal digital assistants (PDAs), handheld computers, cellular telephones, or any type of device that can couple to the general web service component 104 via the interface component 102. By way of example, a particular user need not be associated with a particular one of the client components 106. According to this example, the user can access and/or modify data in the user data store 108 of the general web service component 104 at a first time utilizing a first client component 108 such as a personal computer and, at a later time, the user can execute an application stored in the user data store 108 via employing a second device such as a cellular phone; however, the claimed subject matter is not so limited. The general web service component 104 and the client components 106 can be coupled via any type of connection. For instance, the general web service component 104 and the client components 106 can be coupled with a wired, a wireless, a combination thereof, etc. connection.

Although the interface component 102 is depicted as being separate from the general web service component 104, it is contemplated that the general web service component 104 can include the interface component 102 or a portion thereof. Also, the interface component 102 can provide various adapters, connectors, channels, communication paths, etc. to enable interaction with the general web service component 104.

Figure 2:
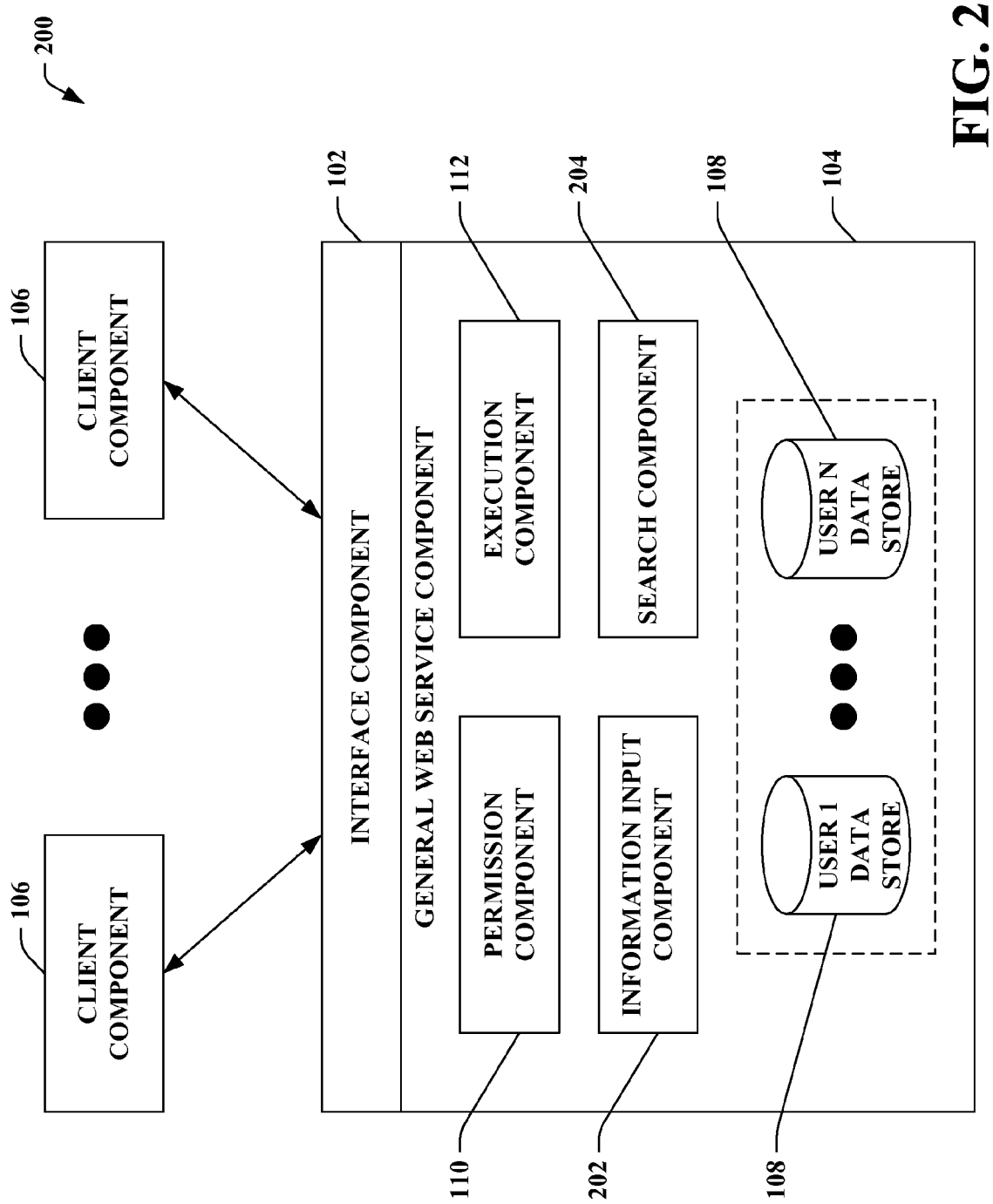
FIG. 2 illustrates a block diagram of an exemplary system that obtains and/or searches for any type of data from any location with any type of client component.

With reference to FIG. 2, illustrated is a system 200 that obtains and/or searches for any type of data from any location with any type of client component 106. The system 200 includes the interface component 102 that can be coupled to the general web service component 104. The interface component 102 can enable the general web service component 104 to receive and/or transmit data to the client components 106. The general web service component 104 can further comprise the user data stores 108, the permission component 110 that can enable defining and/or enforcing access permissions, and/or the execution component 112. Further, the general web service component 104 can include an information input component 202 and/or a search component 204.

The information input component 202 can insert data into the user data store 108 associated with a particular user. The inserted data can be received from any source. By way of example, the data can be provided by one or more of the client components 106. Additionally or alternatively, the data included by the information input component 202 can be from a user data store 108 associated with a disparate user. Pursuant to an illustration, a first user can assign access permissions with the permission component 110 that allow any disparate user to write within a portion of his or her allotted space. Thus, a second user can write data into this portion of the space allotted to the first user with such assigned access permissions. For instance, the second user can provide information from his or her allotted space upon the general web service component 104 and/or from one or more of the client components 106 employed by the second user to the user data store 108 associated with the first user.

The information input component 202 can collect data to be included in the user data store 108. Further, the information input component 202 can determine and/or associate a context with the collected data. For example, the information input component 202 can provide contextual information related to a source of the data, a time of receipt, a manner of obtaining the data, disparate users receiving the data, and the like. Also, the information input component 202 can organize the collected data. For instance, the information input component 202 can insert received data that is not to be shared in a secure segment (e.g. with the permission component 110 denying access to disparate users, . . . ) of the user data store 108 associated with the user. Additionally or alternatively, the information input component 202 can locate data to be shared in a folder with access permissions allowing others (e.g., friends, anyone, . . . ) to read the data. Moreover, the information input component 202 can index the information provided into the user data stores 108.

For instance, the general web service component 104 can allocate space to each particular user; thus, the allocated space can be a respective user data store 108 for each of the users of the general web service component 104. It is to be appreciated that the allocated user data store 108 for a particular user can be separate from the user data stores 108 allotted to disparate users, can be a portion of a larger data store that includes space for any number of users, can be segment(s) of a number of data stores, and the like. Further, the user data stores 108 can be located at a centralized position and/or any number of disparate locations. The user data stores 108 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data store can be a server, a database, a hard drive, and the like.

The search component 204 can enable identifying and/or locating information included in the user data stores 108. The search component 204 can abide by the access permissions defined by the permission component 110. According to an example, a user can input a query to the search component 204 and the search component 204 can yield results from the portion(s) of the user data stores 108 for which the particular user has appropriate access permissions. Additionally, for instance, the search component 204 can be utilized by a user (e.g., via one of the client components 106), an application (e.g., stored upon the general web service component 104, . . . ), and the like. It is contemplated that the search component 204 can return results that can be tailored to a user's profile associated with the general web service component 104; however, the claimed subject matter is not so limited.

Figure 3:
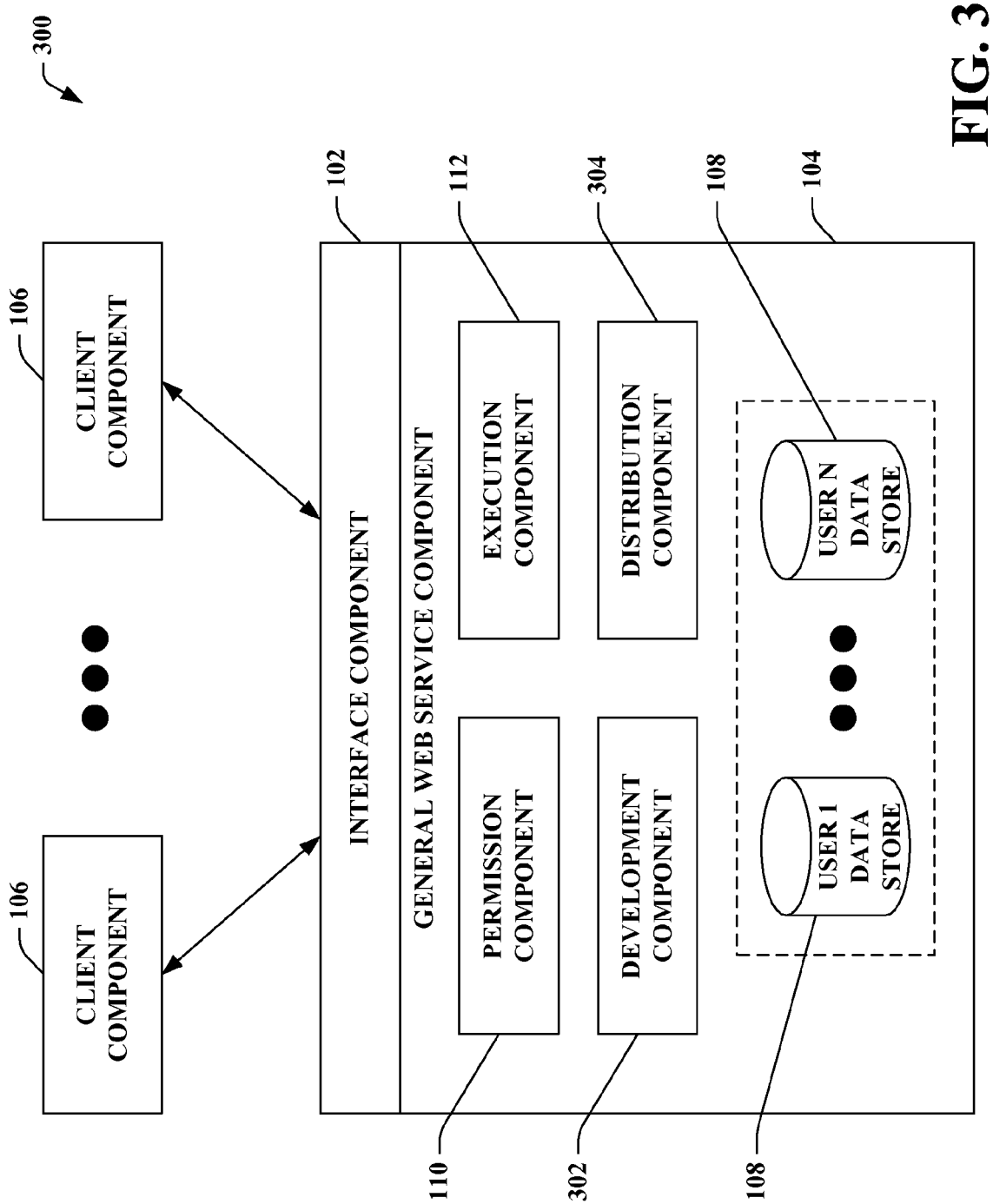
FIG. 3 illustrates a block diagram of an exemplary system that facilitates developing and/or distributing additional service(s) and/or feature(s) built upon a generalized web service.

With reference to FIG. 3, illustrated is a system 300 that facilitates developing and/or distributing additional service(s) and/or feature(s) built upon a generalized web service. The system 300 can include the interface component 102, the general web service component 104, the client components 106, the user data stores 108, the permission component 110, and/or the execution component 112, which can be substantially similar to the aforementioned descriptions. Additionally, the general web service component 104 can include a development component 302 and/or a distribution component 304.

Additional service(s) and/or feature(s) can be created with the development component 302. The development component 302 can be utilized to generate interfaces that can interact with data stored in the user data stores 108, for instance. By way of illustration, the development component 302 can provide tools that can enable generating a script that can utilize the data from the general web service component 104 (e.g., stored in one or more of the user data stores 108, . . . ). Pursuant to an example, the development component 302 can be employed to create an application that can allow the client components 106 to interact with email, post and/or index shared digital photographs, etc.; however, the claimed subject matter is not so limited as it is to be appreciated that any type of application can be created with the development component 302.

Further, the distribution component 304 can enable providing the developed service(s) and/or feature(s) to disparate users employing the general web service component 104. For instance, the distribution component 304 can provide a copy of a script generated with the development component 302 to one or more disparate users; thus, the script can be stored within the user data stores 108 associated with each of the disparate users. According to another illustration, the distribution component 304 can provide a link to the script yielded by the development component 302. Thus, pursuant to this illustration, upon logging on to the general web service component 104, a user can be presented with an icon providing a link to the new script (e.g., developed by a third party, . . . ); however, the claimed subject matter is not so limited.

Figure 4:
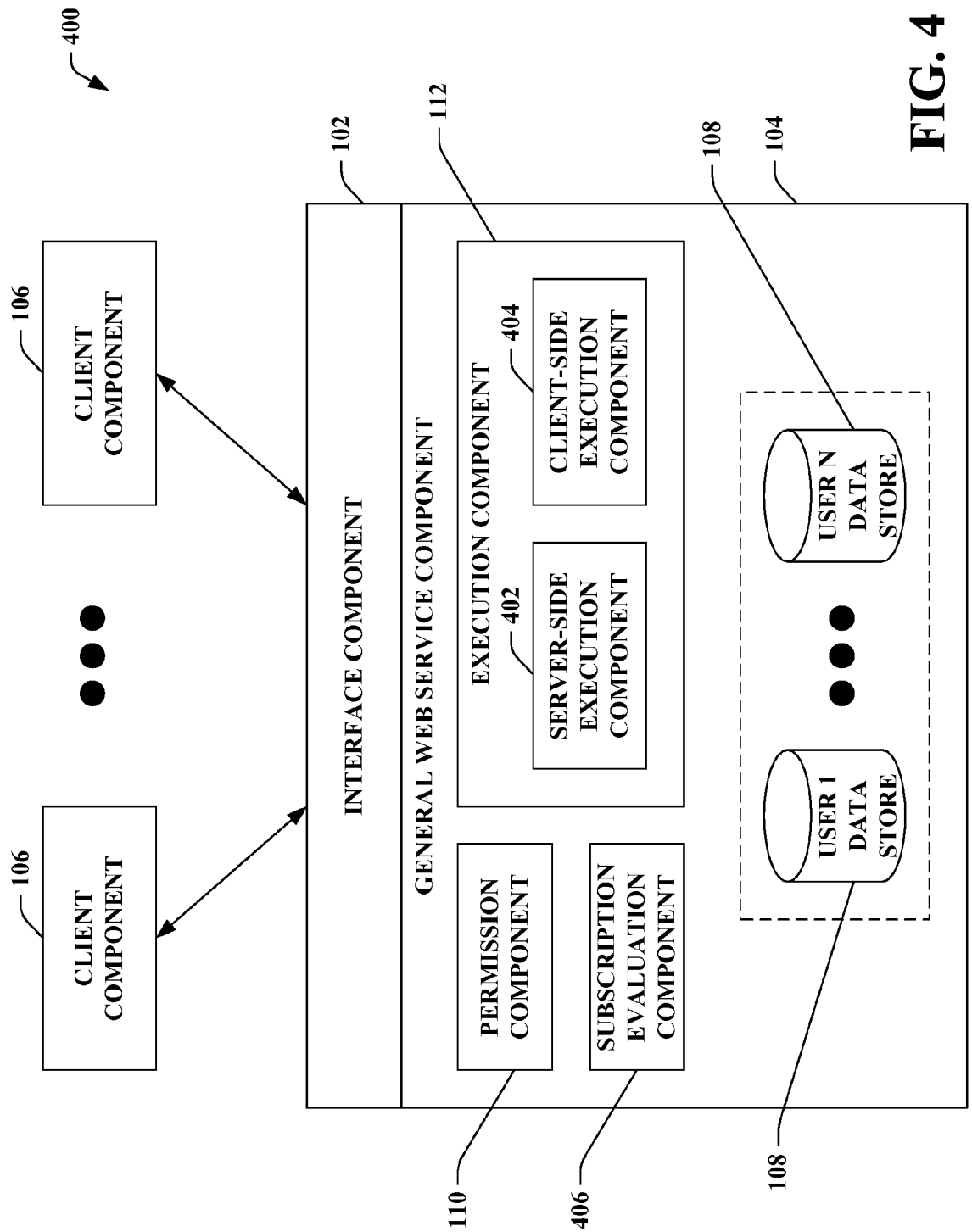
FIG. 4 illustrates a block diagram of an exemplary system that performs operations associated with executable code at various locations.

Turning to FIG. 4, illustrated is a system 400 that performs operations associated with executable code at various locations. The system 400 includes the interface component 102 that can obtain and/or provide data to the client components 106. The interface component 102 can be coupled to the general web service component 104. Additionally or alternatively, the general web service component 104 can include the interface component 102. Further, the general web service component 104 can include the user data stores 108 that can be accessible from any location (e.g., associated with the client components 106). Also, the user data stores 108 can include any type of data including, for instance, executable code. The permission component 110 can additionally enable a user to define access permissions associated with his or her information retained as part of the user data store 108 corresponding to the user.

The execution component 112 can effectuate operations associated with executable code that can be retained in the user data stores 108. For instance, the executable code can be stored in the user data store 108 assigned a user who initiated the operation. Additionally or alternatively, the executable code can be maintained in a disparate location (e.g. the user data store 108 corresponding to a disparate user, . . . ). The execution component 112 can further comprise a server-side execution component 402 and a client-side execution component 404. The server-side execution component 402 can perform a subset of the computations of the executable code upon a server (e.g., the general web service component 104, . . . ). The client-side execution component 404 can effectuate providing information to one or more of the client components 106. Thereafter, the client components 106 can perform a disparate subset of the computations associated with the executable code.

According to an example, the server-side execution component 402 can perform light computations and the heavy computations can be performed on the client side (e.g., via providing data to effectuate such computations with the client-side execution component 404 to one or more of the client components 106, . . . ). For instance, executable code can enable reading email in an inbox. The server-side execution component 402 can perform light computations associated with assembling the email data from the user data store 108. Thereafter, the assembled email data can be provided by the client-side execution component 404 to one or more of the client components 106 along with instructions for displaying such data. Thus, the one or more client components 106 can perform the received instructions and accordingly render the email data. It is to be appreciated that the client components 106 can perform any computations in addition to or instead of rendering a display.

The general web service component 104 can additionally include a subscription evaluation component 406 that can perform operations based upon a subscription purchased by a user. Thus, depending upon a subscription purchased by a user, more or less computations can be performed by the server-side execution component 402. For instance, if a user has a free subscription, the server-side execution component 402 may assemble data and provide the data and computational instructions to one or more of the client components 106 for further execution. Pursuant to another example, with a premium subscription identified by the subscription evaluation component 406, more computations can be performed with the server-side execution component 402, and thereby, the amount of computations performed by one or more of the client components 106 can be reduced. Additionally or alternatively, the subscription evaluation component 406 can enable disparate subscriptions to have differing priorities related to utilization of available server side resources. Thus, when performed at similar times, computations associated with a higher priority (e.g., a premium subscription) can be performed upon the general web service component 104 with the server-side execution component 402 while similar computations associated with a lower priority (e.g., a free subscription) can be transferred by the client-side execution component 404 for execution by the client component(s) 106. However, it is to be appreciated that the claimed subject matter is not limited to the aforementioned illustrations.

Figure 5:
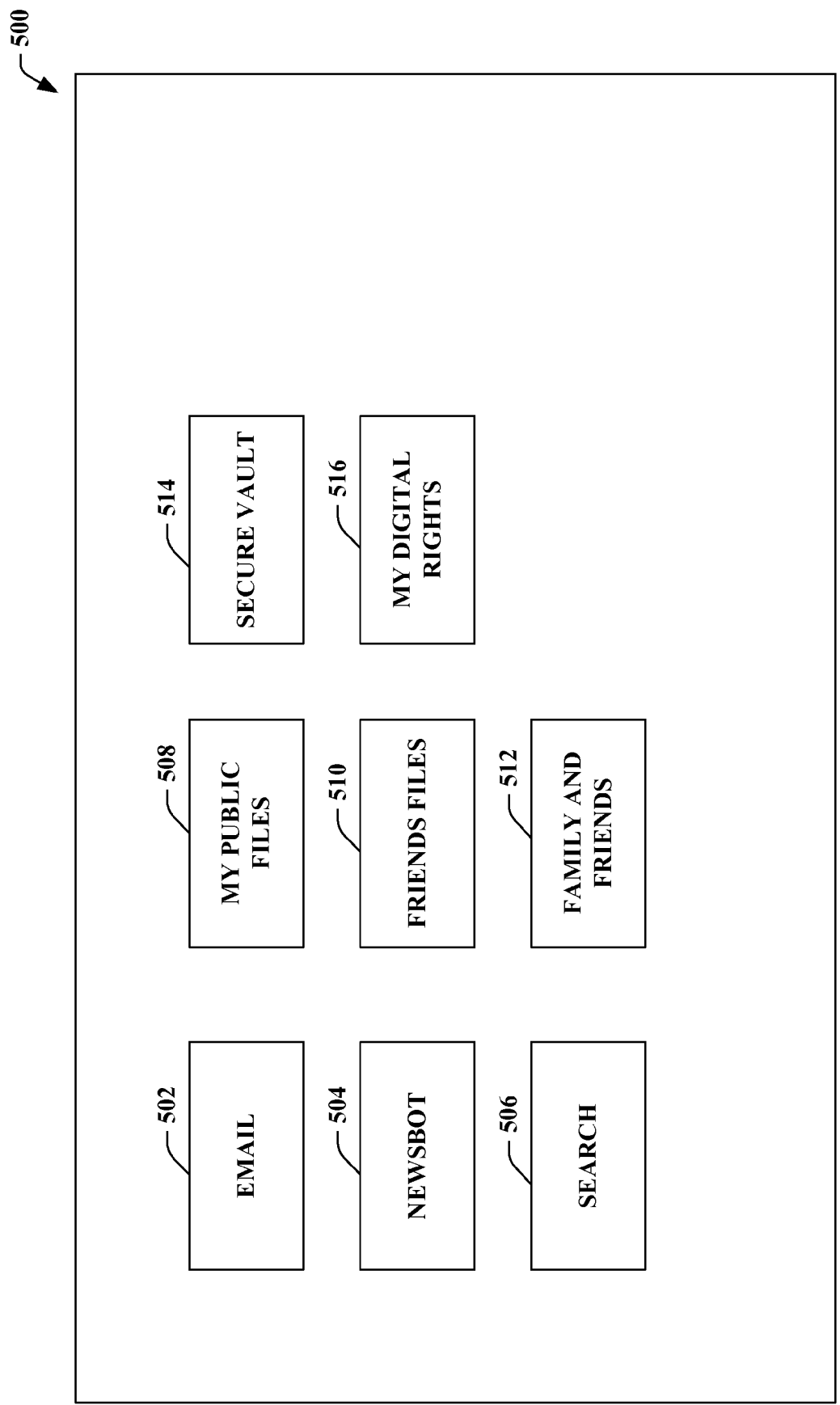
FIG. 5 illustrates a sample graphical user interface that can be employed in connection with a general web service component.

With reference to FIG. 5, illustrated is a sample graphical user interface 500 that can be employed in connection with a general web service component (e.g., the general web service component 104). For instance, a user can logon to the general web service component via providing a username, a password, and/or a domain name. After logon, the graphical user interface 500 can be displayed such that the user can see any number of icons. The icons can be, for example, folders, applications, etc. For instance, an email icon 502 can be displayed. Selecting the email icon 502 can facilitate opening an interface with an email application. The interface can be a standard interface provided in connection with the general web service component, custom designed by the user, obtained by the user from a third party, etc. The graphical user interface 500 can additionally include a newsbot icon 504 and/or a search icon 506. For instance, the search icon 506 can be associated with a search that can be multifunctional such as to enable a user to search various parts of the general web service component (e.g., the user data stores 108 of FIG. 1, . . . ) and/or the web.

Additionally, a number of icons for folders can be included as part of the graphical user interface 500. For instance, a My Public Files icon 508 can be related to a folder that can have public access permissions. Accordingly, data stored in the My Public Files folder can be viewed by anyone utilizing the general web service component. Additionally, such a folder can serve the function of either the World Wide Web (WWW) or a WebLog.

Another icon could be named friends files 510. This folder can have access permissions for friends. Whatever is stored in the folder can be viewed by a user's friends; thus, the folder can provide the functionality of social networking sites. A further folder can be named family and friends 512, which can have access permissions set for family and friends. Accordingly, utilizing the family and friends folder, photos and/or other files can be shared with a user's family and friends. Another folder could be a secure vault 514. The files in this folder can be encrypted and can be used for storing sensitive information such as financial information. Another folder can be a My Digital Rights folder 516, which can store floating licenses for personal use and/or certificates for various software and content (e.g., license that can allow one to read an e-book, listen to a music file, view a video file, . . . ). This folder can include certificates required to read email and other content protected by Digital Right Management applications. The general web service component additionally can enforce the policy permitting one login to one account at one time. This can allow software sellers to sell software licenses for personal use. It is currently quite common for a user to employ more than one computer. If somebody purchased a license then he/she may want to use it on any of the computers he/she uses. On top of these icons, there could be many other icons created or installed by users. It is to be appreciated that install can mean a link to HTML/.NET/GUTT programming language files stored on the general web service component (either on the user's share or other places on the general web service component). Accordingly, the general web service component can provide a higher user satisfaction and ease of use by putting data a user needs at one place as compared to conventional techniques.

Figure 6:
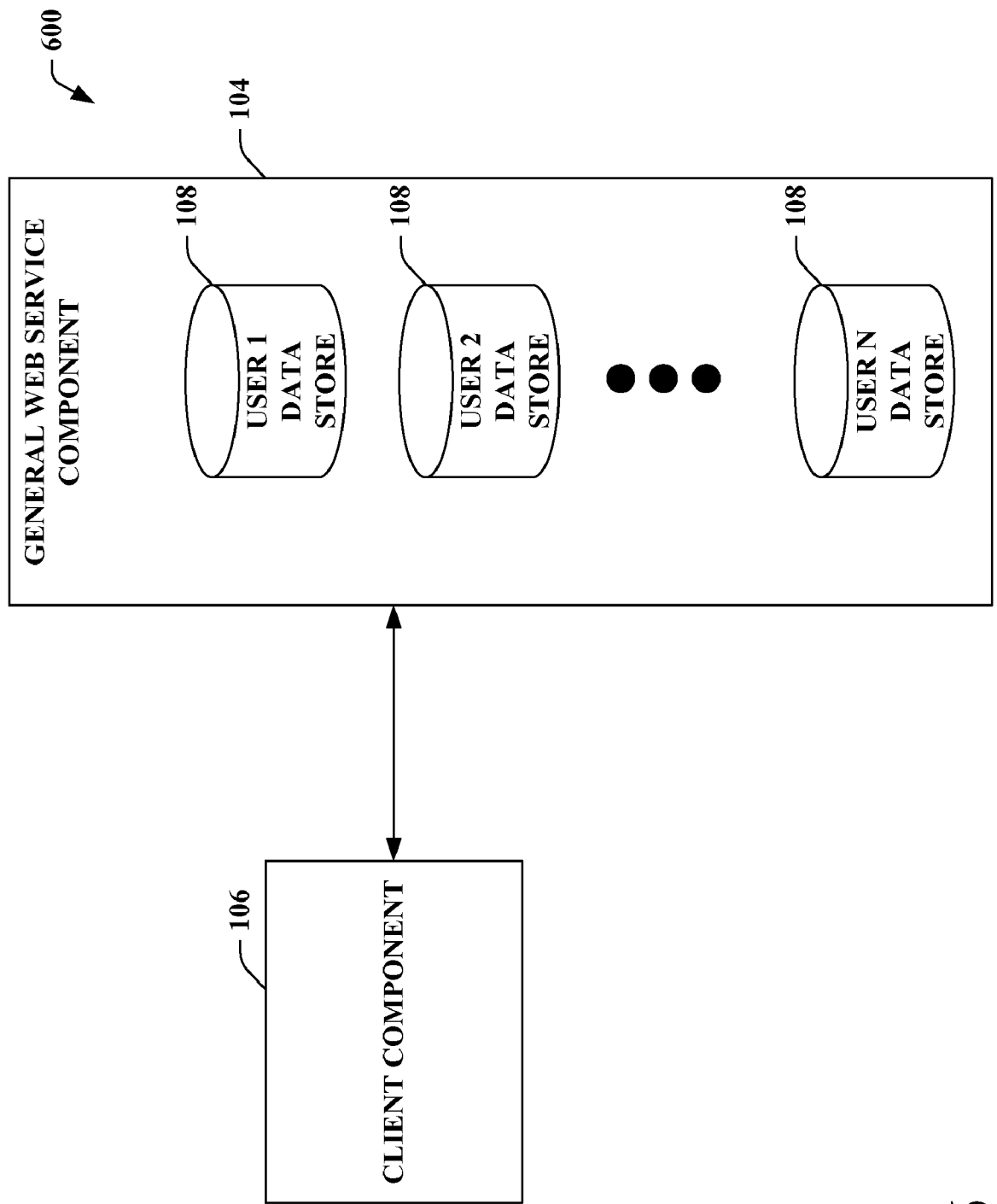
FIG. 6 illustrates a block diagram of an exemplary system that employs a centralized implementation for a generalized web service.

With reference to FIG. 6, illustrated is a system 600 that employs a centralized implementation for a generalized web service. The system 600 includes the general web service component 104 that can be coupled to the client component 106. The general web service component 104 additionally can include N user data stores 108, where N is any positive integer. For instance, each of the user data stores 108 can be associated with a respective user. Although not depicted, it is to be appreciated that a lesser number of data stores can be employed, whereby each user can be associated with a particular allocation within one or more of the data stores. The centralized implementation illustrated in associated with the system 600 can enable effectuating efficient queries. Additionally, the centralized general web service component 104 can provide for an efficient and powerful search engine. According to the centralized implementation, the general web service component 104 can be located upon a server and/or a plurality of servers.

Figure 7:
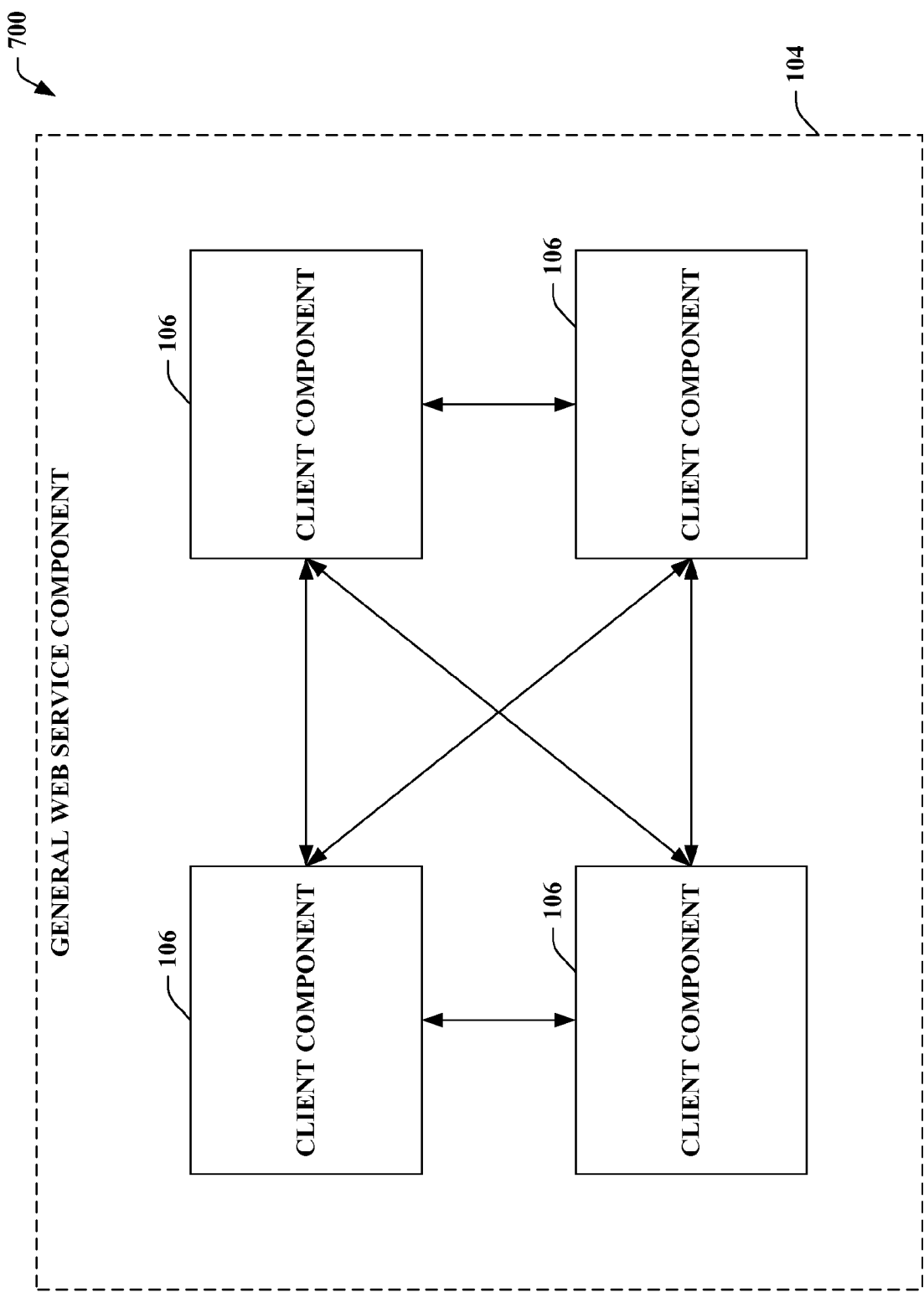
FIG. 7 illustrates a block diagram of an exemplary system that utilizes a peer-to-peer setting for a generalized web service.

Turning to FIG. 7, illustrated is a system 700 that utilizes a peer-to-peer setting for a generalized web service. The system 700 includes the general web service component 104 that can employ an infrastructure built upon any number of client components 106. By employing a peer-to-peer architecture, costs associated with the general web service component 104 can be lowered as compared to the general web service component 104 implemented utilizing a centralized infrastructure. Each of the client components 106 can be connected via at least a broadband connection; however, any type of connection between client components 106 falls within the scope of the subject claims. Additionally, it is contemplated that the client components 106 can be associated with a static IP address. Utilizing the peer-to-peer setting, the general web service component 104 can leverage resources provided by each of the client components 106. By way of illustration, the general web service component 104 can utilize memory and/or processors associated with each of the client components 106; however, the claimed subject matter is not so limited. The general web service component 104 can additionally provide for extensive and powerful searching.

Figure 8:
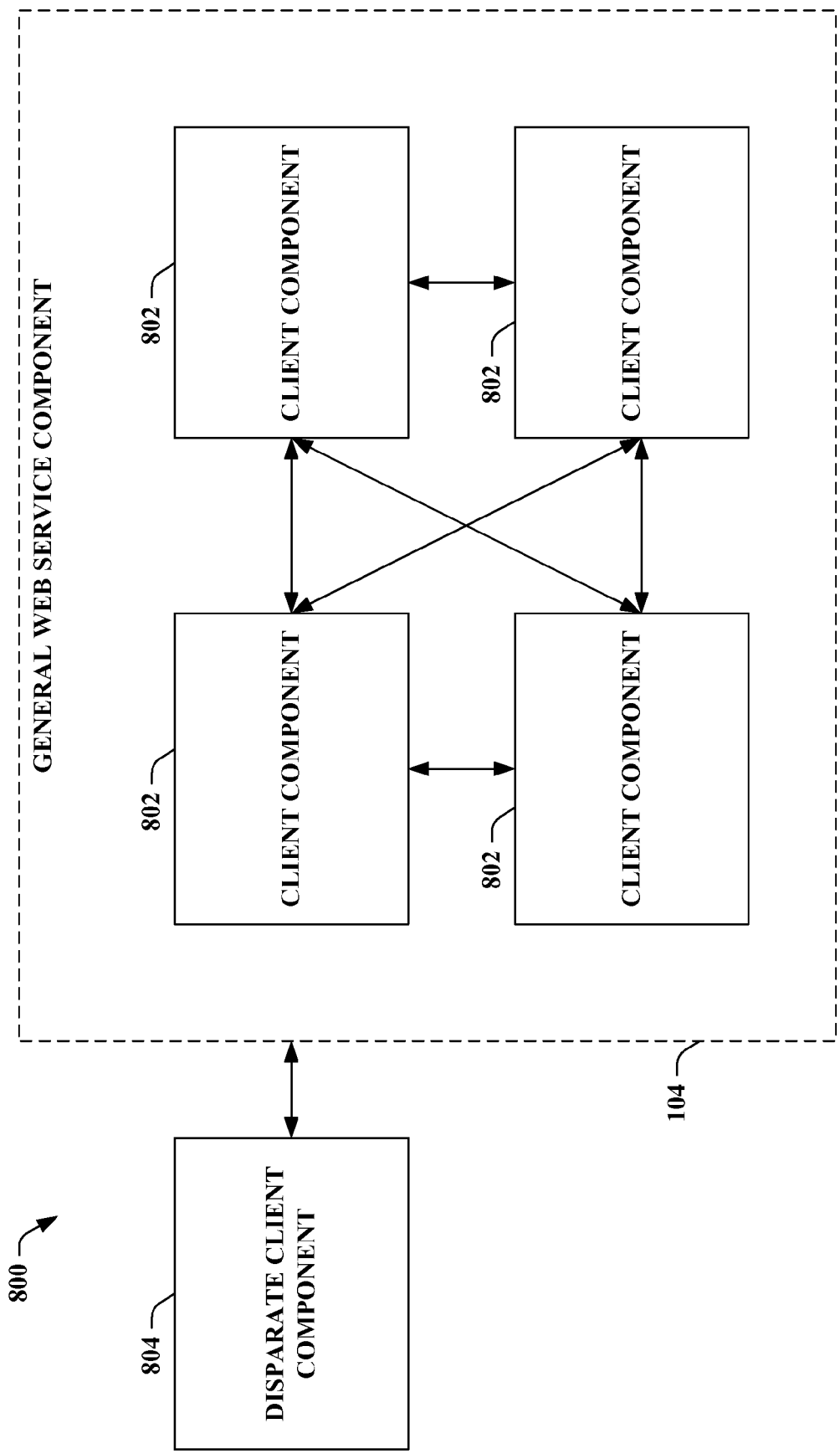
FIG. 8 illustrates a block diagram of an exemplary system that provides a generalized web service hosted upon a subset of devices employed in connection with the general web service component.

With reference to FIG. 8, illustrated is a system 800 that provides a generalized web service hosted upon a subset of devices employed in connection with the general web service component 104. The system 800 includes the general web service component 104 that can be built upon any number of client components 802 (e.g., the client components 106 of FIG. 1, . . . ). For instance, the client components 802 can be associated with a reliable network connection, a static IP address, and/or a registered domain name; however, the claimed subject matter is not so limited. The client components 802 can each host a share of the general web service component 104. Additionally, the client components 802 can provide an interface to integrate any number of disparate client components (e.g., disparate client component 804, the client components 106 of FIG. 1, . . . ). The disparate client component 804 can access and utilize any functionality associated with the general web service component 104. Additionally or alternatively, a centralized general web service component 104 can be employed in connection with a peer-to-peer infrastructure. Disparate client component(s) 804 can thus connect to such a general web service component 104 to enable the functionality described herein.

The following provides several examples of existing services that can benefit from employing the general web service component 104 as described above. It is to be appreciated that these examples are provided as illustrations and the claimed subject matter is not so limited.

Pursuant to an example, an online electronic invitation provider can leverage the general web service component 104. The electronic invitation provider can be a third party. A user can register with the electronic invitation provider and create an invitation to be sent. The user can enter guest lists and the guests can receive the invitation in an email. Thereafter, the guests can RSVP for the event. As compared to conventional systems where the electronic invitation provider typically maintains a database, the information can instead be stored upon the general web service component 104 (e.g., upon one or more of the user data stores 108, . . . ). Additionally, the general web service component 104 can enable the user to utilize services associated with the electronic invitation provider while mitigating a need for creating a disparate logon and/or maintaining or synchronizing copies of an address book.

Utilizing the general web service component 104, the electronic invitation provider can write an HTML/.NET/GUTT script and include the script on the general web service component 104. A user can then link to the script. When executed by a user, the script can have similar access permissions as the user, and hence, the script can access the address book of the user. When the user executes the script, advertisements viewed by the users can be provided by the electronic invitation provider. Further, the level of service provided by the electronic invitation provider can be increased as compared to conventional systems. In the new paradigm associated with the general web service component 104, the electronic invitation provider can yield advice pertaining to the timing of an event because schedules of the guests can be inspected (e.g., if permissions for friends and family are accordingly set, . . . ). Additionally, customizing the invite itself can be easier e.g., one need not load up the picture and/or other media content; instead a link can be provided to content that can be already stored on the general web service component 104. After the event, pictures and other media can be uploaded on the general web service component 104 and shared with the guests. Also, the invitation, if accepted by a guest, can be included as an entry into calendar(s) of the guest(s).

Pursuant to another illustration, an online classified service can employ the general web service component 104. The task of online classifieds can be broken down into two subtasks—listing and searching. Listing can be done by a user by putting a description of the item in a file with public access permissions. This can be made convenient by the online classified company by providing an HTML/.NET/GUTT script. This can be analogous to putting a "for sale" sign at the front of house to be sold. The online classifieds then can provide a search engine to locate items of interest. For instance, the search component 204 can be utilized to locate these items. Additionally or alternatively, a disparate search engine can be developed and/or employed in connection with locating these listings. Moreover, the classified service can provide auctioneering mechanisms.

According to another illustration, an online opinion service can be built upon the general web service component 104. The opinion service can provide the tasks of listing and searching. Thus, people can list their opinions about various products and/or services (e.g., in space allocated to the opinion service, space assigned to the users, . . . ) to allow future buyers to obtain advice. Again, listing can be done with the help of HTML/.NET/GUTT scripts and a search engine can be developed from the search component 204.

For instance, the open source community can also utilize the general web service component 104. The open source community can be quite successful in developing software for computers. One reason behind this success can be that software commonly does not need infrastructure. For this very reason, the open source community may not have commonly developed web services. With the general web service component 104, infrastructure can be provided to enable development by open source community. By way of example, an open source encyclopedia can be developed upon the general web service component 104 without maintaining a separate database. Volunteers can contribute articles by putting them in a folder with public access permissions in their own share of the general web service component 104 and putting an index entry to their articles at another location associated with a disparate user account (e.g., that can include index entries for any number of articles from disparate authors, . . . ). Further, an HTML/.NET/GUTT script can be developed to effectuate these tasks.

There are two basic reasons supporting why web services could be more efficient on the general web service component 104. One, there can be a lot of common effort in running those services which can be abstracted out on the general web service component 104. Two, there may not be much need to maintain the databases of users and their profiles for every web service. The general web service component 104 can maintain the databases of users and associated profiles. Web services can maintain the database of their offerings only (e.g., an online movie rental company can maintain the database of their DVDs, . . . ). This database could also be provided on the general web service component 104 (possibly at a reduced cost).

Existing services can also be improved by employing the general web service component 104. The general web service component 104 can provide improvements over conventional techniques by offering unification and/or higher flexibility.

For example, searching can be improved by employing the general web service component 104. As the general web service component 104 increases in popularity, a user ID can be a virtual online identification of a person. If a user wants to get personalized search results (e.g., by utilizing the search component 204 of FIG. 2), then she can run the search after logging on to the general web service component 104. This way the search engine would have access to all the personalized information which can help personalize the search results. Conventionally, there can be many different companies trying to personalize search using different aspects of user data. The general web service component 104 can employ a union of all such data.

The general web service component 104 can provide for a search facility (e.g., the search component 204). The general web service component 104 can have different kinds of content with different levels of access permissions. Each user can have access to different sets of data (e.g., one user's friends could be different from a second user's friends, so the first user can have some access to the data which the second user may not have access to, . . . ). Also, disparate users can desire to rank the data of their friends differently.

According to another example, social networks can benefit from leveraging the general web service component 104. Social networks can allow a user to publish his/her detail profile, which can be visible to friends, friends of friends, etc. These networks virtually can allow a friend to introduce all his/her friends to each other. It is believed that this way people would be able to meet new people via a reliable medium.

Having these social networks on the general web service component 104 can allow users to access these networks more frequently. Currently, there may be many people who create a profile on a social network yet infrequently return. Many people may not desire to start utilizing these social networks because creating a comprehensive profile can be time consuming. The general web service component 104 can provide a part of the profile, and thus, this aspect can be lightened. Also, the profile can be helpful in more than one way that could encourage users to create a profile. At the very least, for the frequent users of the general web service component 104, the profile can evolve over time. In this case the major obstacle against the social network can be removed. Users can also have HTML/.NET/GUTT scripts in their allocated space which can allow greater use of these social networks. For example, every time a user logs on, one of these scripts can operate to identify new friends of friends. If such a determination is made, then the user can try to learn more about the new friend of the friend (e.g., by employing a script). One may additionally or alternatively write (or obtain from third parties) more sophisticated scripts.

Online match making sites can also employ the general web service component 104. If a username associated with the general web service component 104 is provided, then match making sites can create a comprehensive public profile of a person at a single place.

Pursuant to a further illustration, many new services can be provided with the general web service component 104. According to an example, airline seating can be improved. Airlines typically do not seat people with common interests together. However, with the general web service component 104, people can associate their username with their frequent flyer number and the airline can seat people with similar interests together—very similar to a workplace where people with common interests or goal have offices together. For example, two chess players or two card players could be seated together. Two people who have listed themselves with Match Making sites and are potentially a good match can be seated together—just like a blind date in public. Further, the passengers' information (e.g., pertaining to the general web service component 104, . . . ) can be hidden. Thus, if one passenger desires to send a short note to another passenger, before the flight or after the flight, then that could be done using the flight number and the seat number as an identity.

An enterprise workspace can also be supported by the general web service component 104, for instance. Companies can create a domain name on the general web service component 104 (e.g., by paying a service fee). Employees can have accounts within this domain name. The general web service component 104 can potentially replicate the current model of domains. The benefit to employees can be that the domain can be accessed from anywhere from any device. The benefit to employers can be that the managing the domain can be cheaper as compared to conventional systems. The need to maintain hardware can be mitigated and security policies can be easier to enforce.

One of the advanced features the general web service component 104 can provide is a background trigger based daemon application. A daemon application can be an application which may not be active but can be activated in a background on a specified trigger. Some of the examples can be vacation OOF email, email forwarding, spam filtering, stop and watch order with a broker, etc. In the context of an online auction, the daemon application can be an auto bidding program. With this trigger based daemon application, one (or an open source community) can implement an auction.

The general web service component 104 can also further the vision of ubiquitous computing, which can be associated with making computing invisible. According to an example, devices can examine the environment and can effectuate actions to make users' lives comfortable without user action. The devices can be aware of the contexts and perform computations accordingly. Inputs considered for context can be based upon actions, interactions, friends, family, profession, hobby, interests, etc. If the general web service component 104 can track and organize actions and interactions, such information can be immensely useful for identifying contexts. This could help people meet at the homes, workspaces, airports, conferences, clubs and coffee houses. In a neighborhood there might be a number of people interested in an activity "X", but they may not know this fact and hence not taking advantage of it. At a workplace there might be a possible synergy among workers that they may not even know. A very basic example can be technology transfer at a large corporation. A product group can implement something with which it is satisfied but yet does not realize that there are better solutions possible and/or there are people within the corporation who are capable of developing better solutions for a similar implementation. Technology transfer can be considered a social activity and it can benefit from an automated solution which can trigger such social activities.

Another example can be E-commerce. If advertisements are to be provided to a user, it can be advantageous to present those which can benefit him/her. Advertisements can be based on searches, email scans and recommendations based on previous purchases. For instance, suppose a user associates his/her grocery cards with the general web service component 104. Local grocery stores' websites can be scanned to recommend a particular store to visit (e.g., based upon weekly deals, . . . ). Currently, the grocery store benefits with grocery cards helping them to evaluate what to put on sale at a particular time. The general web service component 104 can extend this benefit both ways and it can even display on a mobile device the items a user may want to buy this week, thereby increasing the economic activities. Suppose a user enters a toy store to buy toys for his son. As soon as he enters, a mobile device can contact the general web service component 104 and identify that his friend's ten-year old daughter's birthday is coming up and she may like to have the item X on her birthday, which is available right now at this particular store at a very attractive price. The mobile device can give the user this information without even the user asking. Similarly, this can be done while shopping online and potentially can save the user effort and money (e.g., shipping charges). For instance, a product recommendation can be based upon purchases by a user and/or disparate users. Suppose, for instance, the user's total bill is $60 and shipping is to be paid, but if it were $75 then shipping costs can be included. The general web service component 104 can help the user decide what to purchase for an additional $15. It can even tell the user things he/she may want but did not desire to spend money on.

Another example that can employ the general web service component 104 can be related to traveling. A global positioning system (GPS) in a car can guide a driver by providing directions. On a long drive, based on users' past patterns and preferences stored on the general web service component 104, the GPS can continuously plan a route. Further, locations for lodging, eating, tourist attractions, gasoline, coffee breaks, etc. can be provided to the user. Reminders can be provided for coffee breaks based on a length of time of non-stop driving. A break can be suggested based upon expected traffic ahead (e.g., if the traveler is driving through a city at peak time, an indication can be provided pertaining to whether a stop should be made for dinner before or after crossing the city). If somebody is a collector, then the GPS can provide a signal indicating what unique things are available on the way. The general web service component 104 can enable providing more relevant computations associated with the aforementioned examples.

Pursuant to another example, one of the folders on the general web service component 104 can be monetary instruments. It can be a strongly encrypted folder containing different types of monetary instruments such as, for instance, ecash, echeck, etc. These monetary instruments can help ecommerce in traditional ways (e.g., one can buy online music, . . . ). There can be more innovative uses also such as, for instance, emergency cash. Suppose a user travels to a new city and has his/her wallet stolen and is left without money. Some banks can arrange emergency cash the next day if prior arrangements are made. However, with the monetary instruments on the general web service component 104, emergency cash can be arranged much faster. Regardless of location, the traveler can logon to the general web service component 104 (e.g. with a cell-phone or a computer at a nearby cybercafé). Thereafter, the traveler can ask a favor from a stranger, a store, etc. to exchange cash for electronic cash which can be transferred via the general web service component 104. If a computer is utilized at a nearby cybercafé, the user can print a traveler check (e.g. with a Bar code representing a value such as $100, which can be used with a pin). Additionally or alternatively, the electronic cash can be similar to a temporary debit card with a pin and a limit (e.g., 100 dollars, . . . ), which can be utilized to pay for the use of cybercafé, as emergency cash for a period of time (e.g., next 24 hours before the user's bank can offer assistance, . . . ).

The general web service component 104 can additionally promote data consistency. It is common for one to use more than one computer during a day such as a computer at home, one at an office and probably one portable. It could be quite irritating to save a file at a home computer with partial work and not find that file to continue work at the office computer. One could instead keep the consistency of a folder at home or at office with a folder on the general web service component 104. Even at a home environment, if one has to email a high resolution picture, one has to first upload it as an attachment. If the picture is also to be emailed to another friend (perhaps with a different message body), then it typically can be uploaded again. This is especially difficult for the dialup users. Instead, if these users can upload these pictures on the general web service component 104 once, then time associated with uploading can be mitigated. Further, these pictures can be uploaded automatically in the background or via a script that uploads them on the general web service component 104 during off peak times.

Recording sharing can also utilize the general web service component 104. For instance, photo-sharing, etc. can be supported. Additional types of records can be shared. For example, a user can share medical records with a new doctor. Pursuant to this example, control access permissions can be set to permit the doctor to review these records. Additionally, the general web service component 104 can support many open source web services. For instance, web invitations, online bookmarks, egreetings, etc. can be provided by the open source community.

Figure 9:
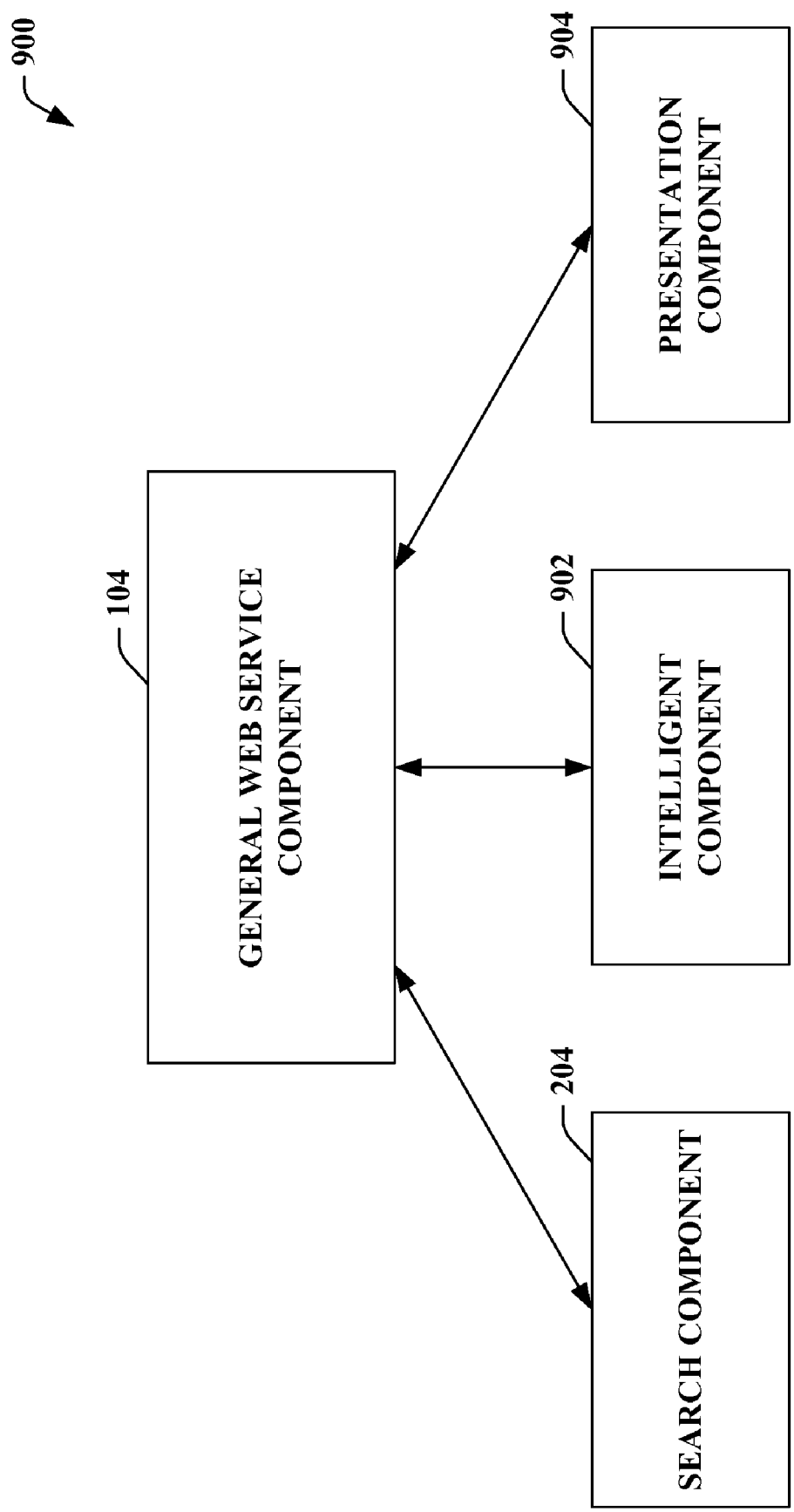
FIG. 9 illustrates a block diagram of an exemplary system that facilitates utilizing a generalized web service.

Turning to FIG. 9, illustrated is a system 900 that facilitates utilizing a generalized web service. The system 900 can include the general web service component 104 and/or the search component 204. The search component 204 can enable performing searches in connection with data stored as part of the general web service component 104. For instance, the search component 204 can search through files associated with a particular user, with a group of users (e.g., friends or family), or files available to be viewed and/or modified by all users. It is to be appreciated that the search component 204 can follow access permissions associated with particular data. The search component 204 can further search for data stored in a centralized location and/or a number of disparate locations (e.g., when a peer-to-peer architecture is utilized in connection with the general web service component 104, . . . ).

The system 900 further includes an intelligent component 902. The intelligent component 902 can be utilized by the general web service component 104 to facilitate searching, indexing, reading, writing, etc. data. According to a further illustration, the intelligent component 902 can enable determining an allocation of computations to be performed on a server side versus on a client side. For instance, such a determination can be made based upon historical usage patterns (e.g., associated with a particular user, a group of users, a general population, . . . ), client component resources, available server-side resources, subscription related information, and the like.

It is to be understood that the intelligent component 902 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 904 can provide various types of user interfaces to facilitate interaction between a user and any component coupled to the general web service component 104. As depicted, the presentation component 904 is a separate entity that can be utilized with the general web service component 104. However, it is to be appreciated that the presentation component 904 and/or similar view components can be incorporated into the general web service component 104 and/or a stand-alone unit. Further, although not shown, it is contemplated that the presentation component 904 can be utilized in connection with one or more of the client components 106 of FIG. 1. The presentation component 904 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the general web service component 104.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 10:
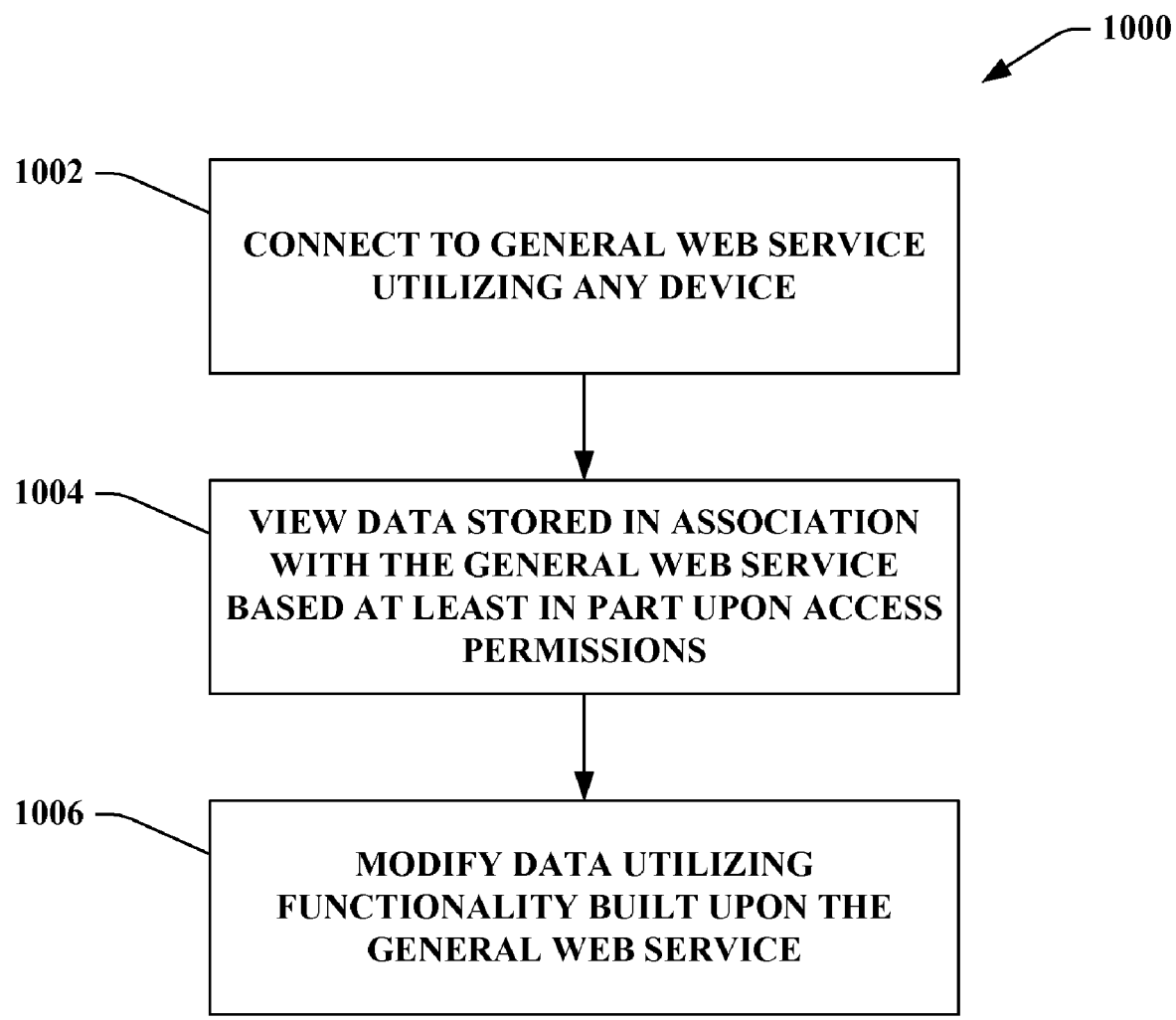
FIG. 10 illustrates an exemplary methodology that facilitates utilizing a generalized web service.
Figure 11:
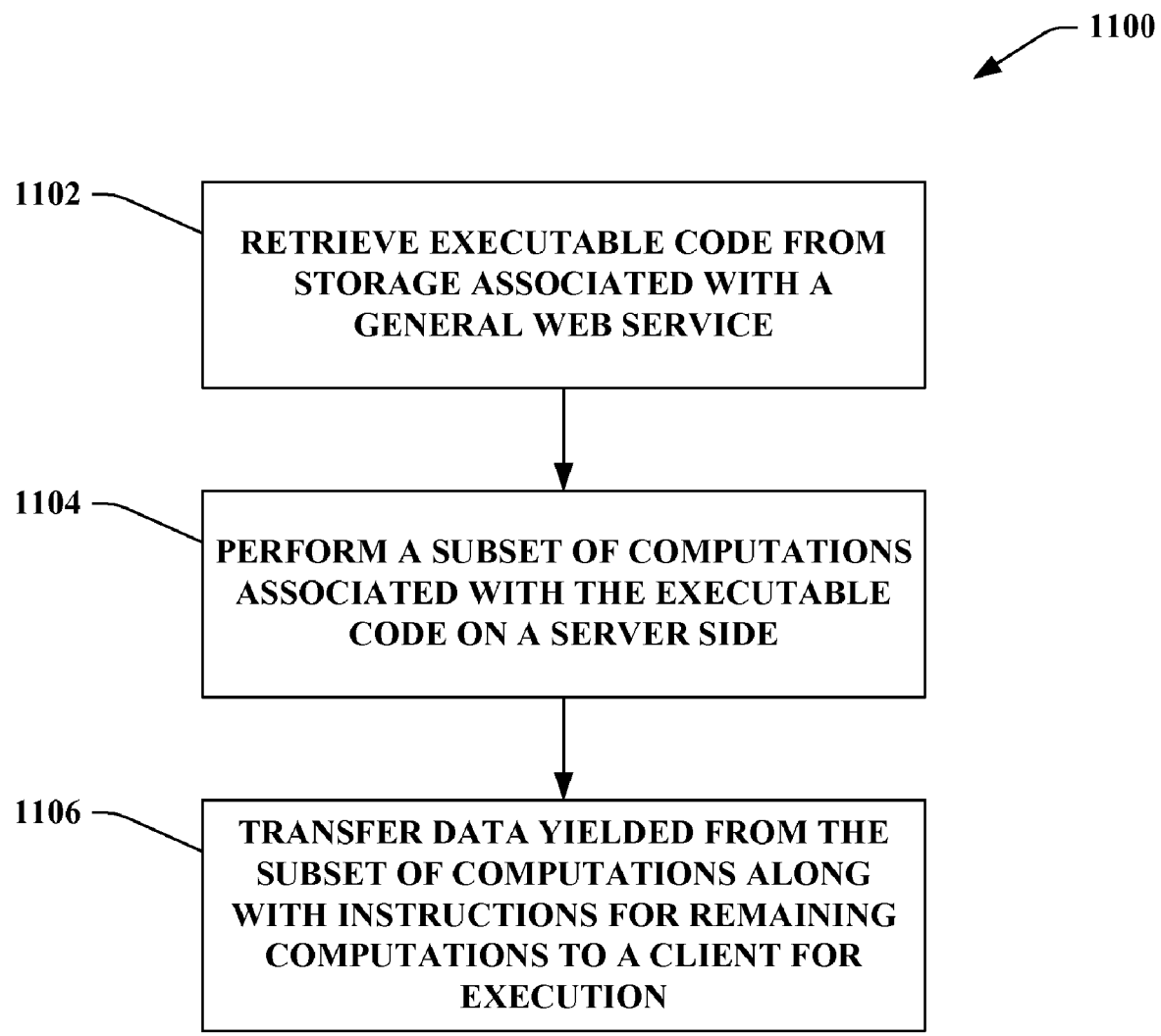
FIG. 11 illustrates an exemplary methodology that facilitates performing computations associated with executable code stored by a user upon a universal, globally available, general web service.

FIGS. 10-11 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

With reference to FIG. 10, illustrated is a methodology 1000 that facilitates utilizing a generalized web service. At 1002, a device can initiate a connection to a general web service. It is contemplated that any type of device can be employed such as, for instance, a personal computer, a handheld computer, a PDA, a cellular telephone, etc. The general web service can be accessible by a user at any time and from any location. The general web service can be hosted centrally, utilizing a peer-to-peer architecture, a combination thereof, etc. At 1004, data stored in association with the general web service can be viewed based at least in part upon access permissions. For instance, searches can be performed over data stored as part of the general web service. The data that is viewed can be related to a user (e.g., secure data not viewable by others), shared data, etc. A user can allocate any access permissions for any data. Further, when viewing data associated with disparate users, the access permissions can be enforced thereby potentially limiting an ability to write, read, delete, execute, etc. data. At 1006, the data can be modified utilizing functionality built upon the general web service. The general web service can be analogous to an operating system for a computer such that further functionality can be developed in connection with web services via employing tools, functionality, features, etc. provided by the general web service.

Turning to FIG. 11, illustrated is a methodology 1100 that facilitates performing computations associated with executable code stored by a user upon a universal, globally available, general web service. At 1102, executable code can be retrieved from storage associated with a general web service. The general web service can allocate space to users, which can be utilized for any user selected purpose. Thus, the space can be employed by a user to include executable code, for instance. According to an illustration, the executable code can be stored within space allocated to a disparate user; thus, pursuant to this illustration, a user can be provided with a link and/or the executable code can be associated with a read permission for a particular user. At 1104, a subset of computations associated with the executable code can be performed on a server side. For example, the light computations can be effectuated. According to an illustration, the data can be assembled (e.g., email data, calendar data, contact data, . . . ). At 1106, the data yielded from the subset of computations can be transferred along with instructions for the remaining computations to a client for execution. Thus, heavy computations can be performed on a client side. Although not depicted, it is to be appreciated that data obtained by the client upon performing the heavy computations can be communicated to the server side for storage; however, the claimed subject matter is not so limited.

Figure 12:
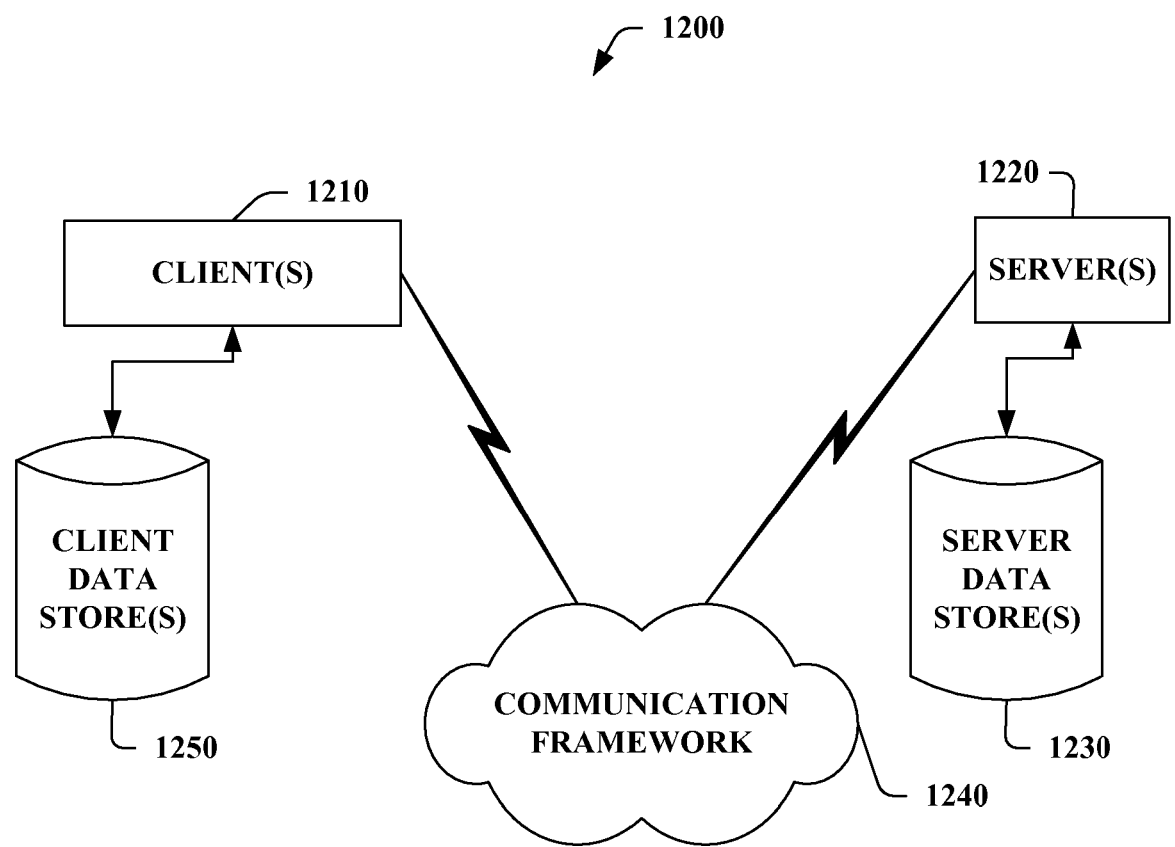
FIG. 12 illustrates an exemplary networking environment, wherein the novel aspects of the claimed subject matter can be employed.
Figure 13:
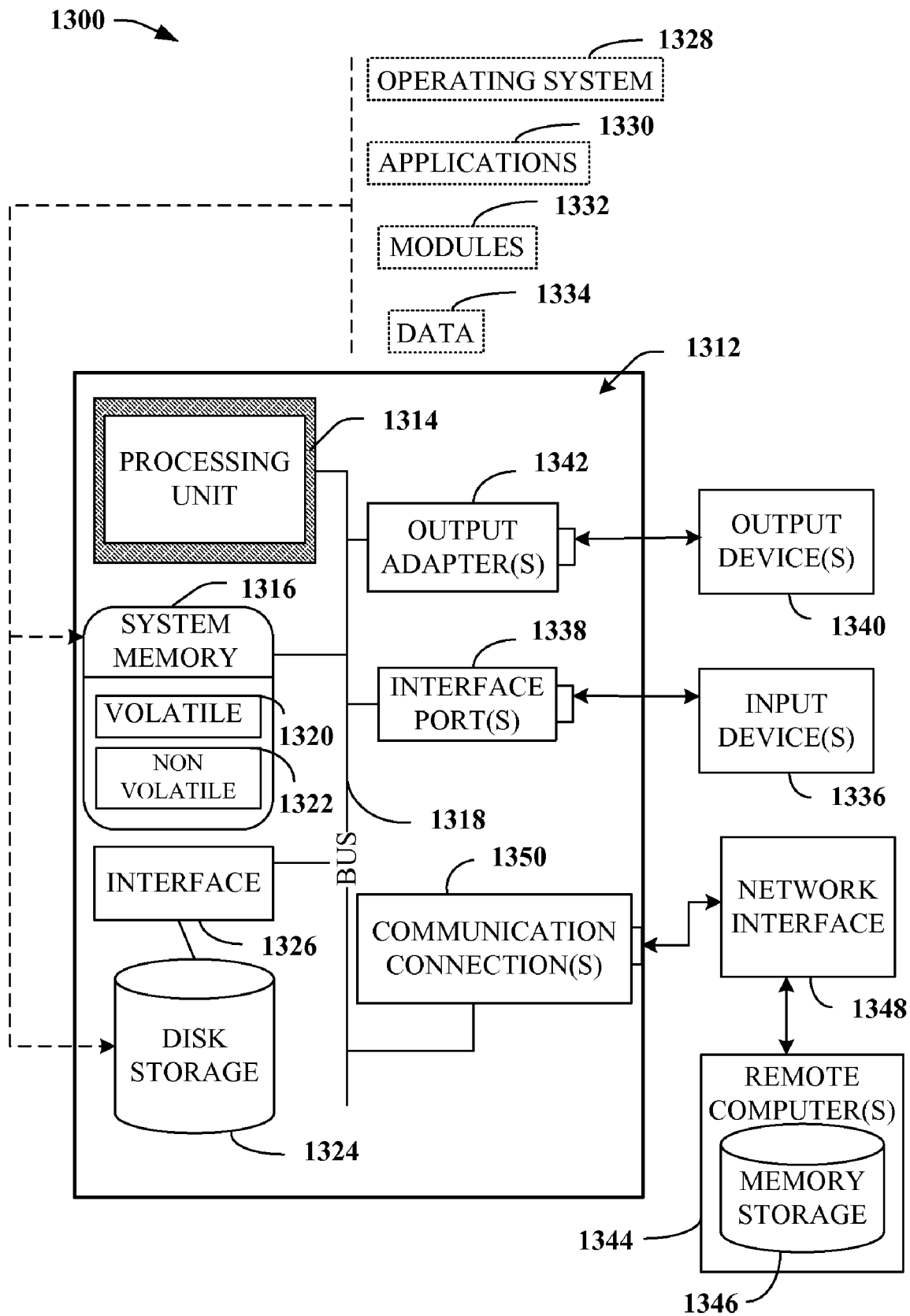
FIG. 13 illustrates an exemplary operating environment that can be employed in accordance with the claimed subject matter.

In order to provide additional context for implementing various aspects of the claimed subject matter, FIGS. 12-13 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 12 is a schematic block diagram of a sample-computing environment 1200 with which the claimed subject matter can interact. The system 1200 includes one or more client(s) 1210. The client(s) 1210 can be hardware and/or software (e.g., threads, processes, computing devices). The system 1200 also includes one or more server(s) 1220. The server(s) 1220 can be hardware and/or software (e.g., threads, processes, computing devices). The servers 1220 can house threads to perform transformations by employing the subject innovation, for example.

One possible communication between a client 1210 and a server 1220 can be in the form of a data packet adapted to be transmitted between two or more computer processes. The system 1200 includes a communication framework 1240 that can be employed to facilitate communications between the client(s) 1210 and the server(s) 1220. The client(s) 1210 are operably connected to one or more client data store(s) 1250 that can be employed to store information local to the client(s) 1210. Similarly, the server(s) 1220 are operably connected to one or more server data store(s) 1230 that can be employed to store information local to the servers 1220.

With reference to FIG. 13, an exemplary environment 1300 for implementing various aspects of the claimed subject matter includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), or flash memory. Volatile memory 1320 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in the suitable operating environment 1300. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the claimed subject matter can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates providing a generalized web service to a user, comprising:
   one or more processors;
   memory to store instructions executable by the one or more processors, the instructions to store:
   an interface component that obtains data from a client component; and
   a general web service component that stores the data associated with user selected access permissions and includes one or more components to enable the user to interact with the data from any location, wherein the access permissions allow the user to modify the type of access afforded to other users to read, write and query the data, and the general web service component employs a verifiable attribute related to the user to allow the user to modify the access permissions, and wherein the one or more components comprise:
   a search component to enable the user to perform a query in accordance with the user selected access permissions and identify a portion of the data included in at least one data store associated with the general web service component, the identified portion of the data being associated with the user selected access permissions specified in the query;
   an intelligent component to facilitate the user searching, indexing, reading and writing the data stored by the general web service component; and
   a presentation component to provide various types of user interfaces to facilitate interaction between the user and any component coupled to the general web service component.

2. The system of claim 1, further comprising a permission component that assigns and enforces access permissions associated with the data.

3. The system of claim 1, further comprising an execution component that effectuates operations associated with executable code stored upon the general web service component.

4. The system of claim 3, wherein the execution component comprises a server-side execution component that performs a subset of computations of the executable code upon a server.

5. The system of claim 4, wherein the execution component further comprises a client-side execution component that provides information to the client component including instructions for performing a second subset of computations of the executable code with the client component.

6. The system of claim 1, further comprising an information input component that collects data, identifies a context of the data, organizes the data and indexes the data.

7. The system of claim 1, further comprising a development component utilized to create at least one of a service and a feature built upon the general web service component.

8. The system of claim 7, further comprising a distribution component that provides one or more of a script and a link to the script for the at least one service and feature to a disparate user.

9. The system of claim 1, further comprising a subscription evaluation component that performs server-side computations based upon a subscription associated with a user.

10. The system of claim 1, wherein the general web service component utilizes a centralized infrastructure.

11. The system of claim 1, wherein the general web service component utilizes a peer-to-peer infrastructure that employs resources associated with N client components, where N is a positive integer.

12. The system of claim 1, wherein the general web service component stores data for any user selected purpose.

13. The system of claim 1, wherein the general web service component utilizes a centralized infrastructure.

14. The system of claim 1, wherein the search component enables the user to search World Wide Web (WWW).

15. The system of claim 1, wherein the general web service component is customized by the user to include one or more components from a third party.

16. The system of claim 5, wherein the intelligent component is configured to determine an allocation of the computations to be performed on a server side versus on a client side.

17. A system for providing a generalized web service for storing and retrieving data, comprising:
    one or more processors;
    memory to store instructions executable by the one or more processors, the instructions to store:
        an interface component that obtains the data from a client component;
        an information input component that collects the data, identifies a context of the data, organizes the data and indexes the data; and
        a general web service component that stores the data associated with user selected access permissions and enables a user to retrieve and modify the data from any location, wherein the access permissions allow the user to modify the type of access afforded to other users to read, write and query the data, and the general web service component employs a verifiable attribute related to the user to allow the user to modify the access permissions, the general web service component comprising:
        a search component to enable the user to perform a query in connection with the data stored by the general web service component and identify a portion of the data included in at least one data store associated with the general web service component, the identified portion of the data being associated with the user selected access permissions specified in the query;
        an intelligent component to facilitate the user searching, indexing, reading and writing the data stored by the general web service component;
        a presentation component to provide various types of user interfaces to facilitate interaction between the user and any component coupled to the general web service component;
        a server-side execution component that performs a first subset of computations of executable code upon the general web service component; and
        a client-side execution component that provides information to the client component including instructions for performing a second subset of computations of executable code with the client component.

18. The system of claim 17, wherein the general web service component utilizes a peer-to-peer infrastructure that employs resources associated with N client components, where N is a positive integer.

\* \* \* \* \*